United States Patent [19]
Guyer et al.

[11] Patent Number: 5,235,456
[45] Date of Patent: Aug. 10, 1993

[54] TUNABLE PULSED SINGLE LONGITUDINAL MODE OPTICAL PARAMETRIC OSCILLATOR

[75] Inventors: Dean R. Guyer, Bellevue; Walter R. Bosenberg, Redmond, both of Wash.

[73] Assignee: Amoco Corporation, Chicago, Ill.

[21] Appl. No.: 698,564

[22] Filed: May 10, 1991

[51] Int. Cl.⁵ .................... H03F 7/00; H07M 5/04
[52] U.S. Cl. ........................... 359/330; 359/326; 372/21
[58] Field of Search ............ 359/330, 326, 328; 372/21, 22

[56] References Cited

U.S. PATENT DOCUMENTS

| | | | |
|---|---|---|---|
| 3,454,902 | 7/1969 | Giordmaine | 359/330 |
| 3,628,186 | 12/1971 | Ashkin et al. | 359/330 |
| 3,662,183 | 5/1972 | Ashkin et al. | 359/330 |
| 4,189,652 | 2/1980 | Levinos et al. | 359/330 |
| 4,349,907 | 9/1982 | Campillo et al. | 359/330 |
| 5,017,806 | 5/1991 | Edelstein et al. | 372/21 |
| 5,033,057 | 7/1991 | Bosenberg et al. | 372/72 |
| 5,053,641 | 10/1991 | Cheng et al. | 372/21 |

OTHER PUBLICATIONS

Minton et al.; "A Scanning, Single Mode . . . Oscillator"; Opt. Commun., vol. 69, #3-4, pp. 289-293, Jan. 1, 1989, abstract only supplied.
Littman et al.; "Grazing Evidence Designs . . . Lasers; Laser Focus/Electro Opt.", vol. 24, #2, pp. 70-86, Feb. 1988 abstracts.
Arnold et al.; "Parametric Oscillator . . . OPO"; Appl. Opt. vol. 16, #4, pp. 809-810, Apr. 1977; abst. only supplied.
Anthan et al.; "Scanning Picosecond . . . Infrared"; Rev. Sci. Ins., vol. 58, #11, pp. 2054-2059, Nov. 1987; abst only.

*Primary Examiner*—Nelson Moskowitz
*Attorney, Agent, or Firm*—Stephen G. Mican

[57] ABSTRACT

Methodology and apparatus for producing pulsed, single longitudinal mode optical energy over a widely tunable range of wavelengths by optical parametric frequency conversion.

4 Claims, 7 Drawing Sheets

TUNABLE PULSED SINGLE LONGITUDINAL MODE OPTICAL PARAMETRIC OSCILLATOR

BACKGROUND OF THE INVENTION

The present invention relates, in general, to optical parametric generation, and more particularly, to a method and apparatus for broadly tuning optical parametric sources that produce single longitudinal mode energy over a wide variety of frequencies.

The conversion of light from one frequency to another in optical crystals using induced quadratic nonlinearities proceeds by a three-wave interaction process that has been described by John David Bierlein and Thurman Eugene Gier in U.S. Pat. No. 3,949,323. The conversion of light from one frequency to another using the quadratic nonlinearity term of the induced polarization in a medium having nonlinear optical properties gives rise to the phenomena of sum and difference frequency mixing. This is a catalytic process, since it occurs with essentially no exchange of energy between the optical crystal and the electromagnetic fields.

Energy conservation requires that the three frequencies involved, herein called the pump ($\omega_p$) signal ($\omega_s$) and idler ($\omega_i$) frequencies meet the condition:

$$\omega_p = \omega_s + \omega_i$$

For efficient energy conversion to occur, it is also required that the momentum or phase velocity of the interacting waves be matched while propagating through the nonlinear medium. This phase matching requirement is defined by the k vectors of the individual waves as:

$$\vec{\Delta k} = \vec{k_p} - \vec{k_s} - \vec{k_i}$$

where $|k| = \omega^* n(\omega)/c$, $\vec{\Delta k}$ is a measure of the phase mismatch, and $n(\omega)$ is the medium index of refraction for the wave at frequency $\omega$.

Phase matching is accomplished and the efficiency of conversion is maximized for $\vec{\Delta k} = 0$. This is typically achieved in nonlinear crystals by rotating the crystal to an angle at which the refractive indices for the waves is such that phase matching is achieved. Application of electric fields, changing the crystal temperature, or varying the relative propagation direction of the three interacting waves can also be used to achieve phase matching. When the k vectors of the three waves are not parallel, the process is termed noncollinear phase matching. The special case where all three waves are parallel is termed collinear phase matching.

Tunable pulsed optical parametric oscillators (OPOs) using nonlinear optical crystals have been extensively studied and developed since the mid 1960s. These early OPOs, however, typically had relatively broad linewidths, poor temporal and spatial beam qualities and produced relatively low powers and/or energies. In addition, the early OPOs that could provide single longitudinal modes had relatively many parts and were difficult to align.

It was also discovered that mode-hopping and mode beating of these tunable pulsed OPOs occurred as the OPO was tuned over it's entire tuning range. Since output beams that exhibit more than one longitudinal mode of the oscillator are undesirable for many applications, a tunable single longitudinal mode is preferred.

Accordingly, there is a need in the art to provide a simple pulsed OPO that can produce a tunable single longitudinal mode output over a broad range of frequencies at moderate powers for long periods of time.

SUMMARY OF THE INVENTION

According to the invention, single longitudinal mode operation of a tunable pulsed optical parametric oscillator that comprises an optical cavity and a nonlinear optical crystal is achieved by adjusting the nonlinear optical crystal to phase match the frequencies of the conversion process. The phase matched conversion process produces a pulse of optical signal energy in a substantially single longitudinal mode along a reflective optical path in the optical cavity in response to a beam of optical pump energy.

In the preferred embodiment, for a tunable single longitudinal mode optical parametric oscillator comprising an optical cavity having a predetermined optical length and a nonlinear medium, the methodology for producing single mode operation over a wide range of operating frequencies comprises the steps of: reflecting optical energy along a reflective optical path having a reflective path length that is received along said reflective optical path; diffracting a first portion of said reflected optical energy onto a diffraction path having a diffraction path length and a second portion of said reflected optical energy onto an output path, with said predetermined length of said optical cavity substantially equal to the sum of said reflective optical path and said diffraction path length and said optical cavity length being sufficiently short to sustain optical energy having substantially only a single longitudinal mode along said reflective optical path; reflecting optical energy received along said diffraction path back along said diffraction path; and positioning said nonlinear medium along said reflective optical path to produce a pulse of optical energy in a substantially single longitudinal mode along said reflective optical path in response to a pump beam of energy.

In the preferred embodiment, in a tunable single longitudinal mode optical parametric oscillator comprising an optical cavity having a predetermined optical length and a nonlinear medium, the apparatus for producing single mode operation over a wide range of operating frequencies comprises: first means for reflecting optical energy along a reflective optical path having a reflective path length that is received along said reflective optical path; means for diffracting a first portion of said reflected optical energy onto a diffraction path having a diffraction path length and a second portion of said reflected optical energy onto an output path, with said predetermined length of said optical cavity substantially equal to the sum of said reflective optical path and said diffraction path length and said optical cavity length being sufficiently short to sustain optical energy having substantially only a single longitudinal mode along said reflective optical path; second means for reflecting optical energy received along said diffraction path back along said diffraction path; and means for positioning said nonlinear medium along said reflective optical path to produce a pulse of optical energy in a substantially single longitudinal mode along said reflective optical path in response to a pump beam of energy.

In the preferred embodiment, the nonlinear medium is adjusted to phase match the pump, signal and idler frequencies of the conversion process in order to maintain single longitudinal mode operation over a wide range of output wavelengths. The second means for reflecting is preferably movable with respect to the means for diffracting, thereby allowing the optical cavity to resonate at an optical signal frequency that is tunable.

In an alternate embodiment, for a tunable optical parametric oscillator comprising an optical cavity, a nonlinear medium, and a oscillator output path for energy produced by said oscillator, the methodology for producing single mode operation over a wide range of operating frequencies comprises the steps of: pumping said oscillator with pump energy having a pump frequency along a pump beam path that is noncollinear with said oscillator output path to cause said nonlinear medium to produce idler energy having an idler frequency and signal energy along said oscillator output path having a signal frequency; and adjusting said nonlinear medium to phase match said signal energy and said idler energy with said pump beam energy.

In the alternate embodiment, in a tunable optical parametric oscillator comprising an optical cavity, a nonlinear medium, and a oscillator output path for energy produced by said oscillator, the apparatus for producing single mode operation over a wide range of operating frequencies comprises: means for pumping said oscillator with pump energy having a pump frequency along a pump beam path that is noncollinear with said oscillator output path to cause said nonlinear medium to produce idler energy having an idler frequency and signal energy along said oscillator output path having a signal frequency; and means for adjusting said nonlinear medium to phase match said signal energy and said idler energy with said pump beam energy.

DETAILED DESCRIPTION OF THE INVENTION

According to the invention, the performance of an optical parametric oscillator is improved by using optics and optical elements as a cavity to produce tunable single longitudinal mode energy over a wide variety of frequencies. The oscillator of the present invention overcomes the limitations of the prior art by minimizing the number of optical elements required to produce single longitudinal mode energy and providing means to continuously tune the mode in frequency.

Figure 1:
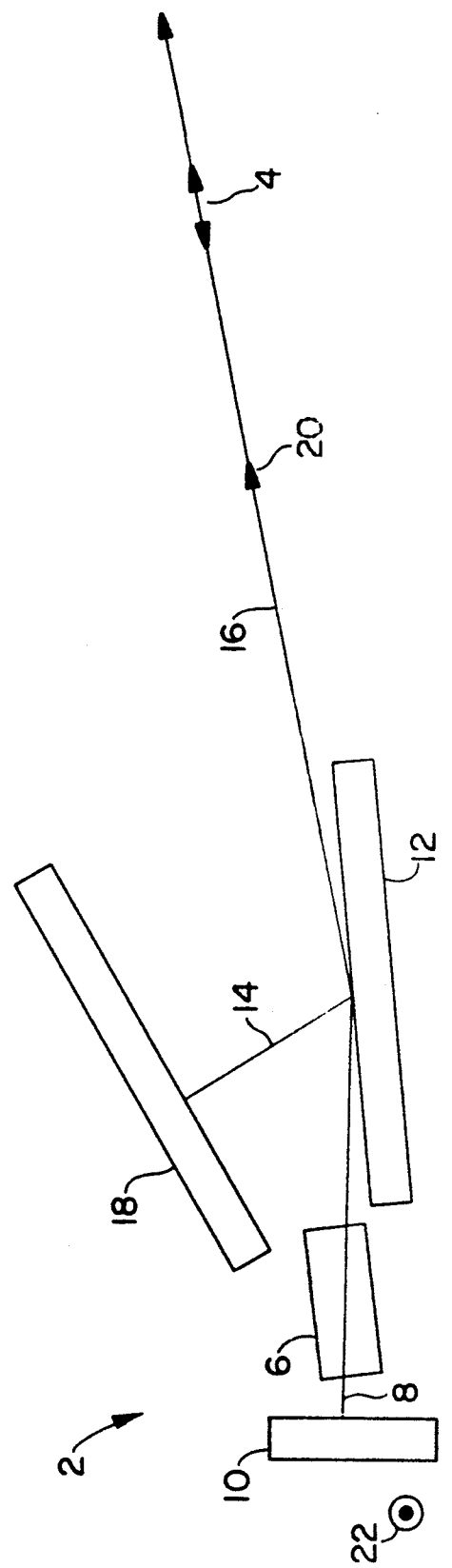
FIG. 1 is a schematic of a first embodiment of a parametric source constructed in accordance with the invention.

FIG. 1 is a schematic diagram of a first embodiment of an optical parametric oscillator 2 constructed in accordance with the invention. The optical parametric oscillator 2 includes a pump laser source (not shown) that transmits pulses of optical energy along a pump path 4. The pump energy from the pump laser source has a pump frequency, such as optical energy that comprises light with a frequency corresponding to a wavelength of 532 nm. It also comprises one or more nonlinear media 6, such as crystals of potassium titanyl phosphate (KTP), placed along a reflective optical path 8. The pump path 4 and the reflective optical path 8 pass through the nonlinear medium 6.

The optical parametric oscillator 2 further comprises a first means for reflecting optical energy 10, that may be, for example, an optical element such as a back cavity mirror. The first means for reflecting 10 reflects optical energy along the reflective optical path 8 that it receives along the reflective optical path 8. The oscillator 2 also comprises a means for diffracting optical energy 12 that may be, for example, an optical element such as a glancing incidence grating.

The means for diffracting 12 diffracts a first portion of the optical energy directed along the reflective optical path 8 by the first order of interference to a diffraction path 14. The means for diffracting 12 reflects a second portion of the optical energy directed along the reflective optical path 8 along an output optical path 16. The oscillator 2 further comprises a second means for reflecting optical energy 18, that may be, for example, an optical element such as a grating feedback mirror. The second means for reflecting 18 reflects optical energy along the diffraction path 14 that it receives along the diffraction path 14.

The oscillator 2 accordingly comprises a resonant cavity path that comprises the reflective optical path 8 and the first order diffraction path 14. The oscillator 2 resonates at discrete frequencies that depend on the sum of the two optical path lengths 8 and 14. The oscillator 2 also comprises an output energy optical path that comprises of the optical paths 8 and 16. In the preferred embodiment, the pump path 4 is collinear with the output energy optical path that comprises the optical paths 8 and 16.

The nonlinear medium 6 is located along the reflective optical path 8, between the first means for reflecting 10 and the means for diffracting 12. In response to the pump beam, the nonlinear medium 6 produces optical signal energy along the reflective optical path 8 at a desired frequency and optical idler energy along an idler path 20 when adjusted to momentum match the frequencies of the conversion process. To permit parametric amplification of the signal energy along both directions of the reflective optical path 8, the first means for reflecting 10 is also reflective at the pump frequency. In the preferred embodiment, the idler path 20 is collinear with the output energy optical path that comprises the optical paths 8 and 16.

The nonlinear medium 6 is preferably a crystal of potassium titanyl phosphate (KTP). In the preferred embodiment, it measures approximately 1.0 cm long in the direction of the first reflective optical path 8 and approximately 0.5 cm each in width and height in a plane perpendicular to the first reflective optical path 8.

Although potassium titanyl phosphate has been found to be particularly effective as the nonlinear medium 6 for producing a single longitudinal mode, other nonlinear materials, such as potassium niobate and b-barium borate, will also work as the nonlinear medium 6. Nonlinear frequency converters are particularly advantageous because of their wide tuning range, their production of two output frequencies from a single cavity with a single pump, their freedom from lifetime limitations as compared to dye gain mediums, and their operation with no deposition of energy in the crystal as compared to media for which gain is a result of optical absorption of pump energy.

The pump beam that impinges upon the nonlinear medium 6 along the pump beam path 4, can be produced by a source (not shown), such as a Nd:YAG laser that operates at 1064 nanometers. Through the use of nonlinear optics, the output of the Nd:YAG laser is frequency doubled to a frequency corresponding to a wavelength of 532 nanometers. Pump beams of widely different frequencies that are transmitted by the nonlinear medium 6 can also be used. The efficiency of the oscillator 2 in producing a single longitudinal mode at the signal frequency is further improved by reducing the spectral width of the pump beam to a single longitudinal mode. For example, the laser pump beam can be supplied by a Nd:YAG laser, such as a Continuum ® model NY-61 Nd:YAG laser, that is injection-seeded to operate on a single longitudinal mode. In this case, the pump pulse has a temporal profile that is nearly Gaussian with a full width at half intensity of approximately 7 nanoseconds after being frequency doubled to a frequency of 532 nanometers. The gain of the nonlinear medium 6 at the signal frequency is near a maximum when the 532 nanometer pump beam is collimated.

The optical parametric oscillator 2 of the present invention shown in FIG. 1 can be continuously tuned by rotating the second means for reflecting 18 with respect to the first means for reflecting 10 about an axis 22 that is perpendicular to the plane of FIG. 1, while at the same time rotating the nonlinear medium 6 to maintain phase matching. This causes the frequency of the optical signal energy along the resonant cavity path that comprises the reflective path 8 and the diffraction path 14 to change in accordance with the frequency of the diffracted first order of the means for diffracting 12 that is, reflected by the second means for reflecting 18.

The length of the optical cavity of the oscillator 2 changes in response to both the rotation of the second means for reflecting 18 and the rotation of the nonlinear medium 6. One location of the axis 22 that gives synchronous tuning without changing longitudinal mode operation for dye laser oscillators is described in "Grazing Incidence Designs Improve Pulsed Dye Lasers", Laser Focus 24, pp. 70-86 (February 1988), by M. Littman and J. Montgomery. Using this location, the longitudinal mode should tune in frequency at the same rate as the resonant frequency of the cavity as the second means for reflecting 18 is rotated. The configuration of the present invention improves continuous single longitudinal mode operation by moving the position of the first means for reflecting 10 to change the optical length of the resonant cavity path that comprises the reflective optical path 8 and the diffraction path as the second means for reflecting 18 is rotated such that the longitudinal mode continuously follows the change in resonant frequency. This improvement permits arbitrary placement of the rotation axis 22.

In an experiment where the tuning bandwidth was limited by angular restrictions of the nonlinear medium 6, the optical parametric oscillator was found to be continuously tunable over greater than 1700 cm$^{-1}$ from 773 to 895 nanometers. The optical parametric oscillator produced 4 to 5 nanosecond pulses, with up to 5 milliJoules of combined signal and idler output. The intrinsic efficiency was approximately 5 percent. The longer pulse length compared to similar oscillators using solid state laser materials such as titanium doped sapphire is due to the absence of gain switching in optical parametric downconversion.

In the experiment, the nonlinear medium 6 comprised a KTP crystal 4 millimeters square in aperture and 10 millimeters in length. Surface reflections were minimized with a triple-band hard antireflection coating optimized at 532, 810, and 1550 nanometers. The first means for reflecting 10 was dielectric coated for maximum reflectivity at both 800 and 532 nanometers. The second means for reflecting was dielectric coated for maximum reflectivity from 600 to 1300 nanometers. The means for diffracting 12 was a gold-plated holographic grating having 1800 grooves per millimeter.

The efficiency of producing a single longitudinal mode is affected by the grazing angle, $a$, formed between the output energy optical path 16 and the surface of the means for diffracting. When $a$ is set to an angle of approximately 6 degrees or less and the sum of the two optical path lengths 8 and 14 is approximately 6 centimeters or less, it is found in the experiment that the oscillator will produce a single longitudinal mode. This behavior is similar to grazing incidence oscillators using solid state laser materials as has been described by K. W. Kangas, D. D. Lowenthal and C. H. Muller III in "Single-longitudinal-mode, tunable, pulsed Ti:sapphire laser oscillator", Optics Letters 14, pp. 21-23 (January 1989) and also by Kenneth W. Kangas is U.S. Pat. No. 4,901,322. Using geometrical ray tracing, it can be shown that the angular change in $a$, $\Delta a$, induced by the means for diffracting 12 for adjacent longitudinal modes on each round trip through the oscillator 2 is given by the approximate relationship:

$$\Delta a \approx \lambda^2 / a d (L_1 + L_2)$$

where $L_1$ and $L_2$ are the lengths of the two optical paths 8 and 14, d is the groove spacing of the means for diffracting 12 and $\lambda$ is the wavelength of the frequency resonated by the oscillator 2. For optically pumped solid state laser materials, this condition means that the transverse dimension of the gain region must be limited in size in order to achieve single longitudinal mode operation such that adjacent longitudinal modes 'walk out' of the gain region before significant amplification occurs. In the present invention, this change in angle with each pass increases the phase mismatch, $\Delta k$, in the nonlinear crystal for the adjacent longitudinal modes and thereby decreases the gain that these modes experience. For example, a 10 millimeter long crystal of KTP pumped at 532 nanometers and producing a signal at 800 nanometers in a cavity having a grazing angle of $\alpha=2$ degrees, a cavity length of 50 millimeters, and using a grating with 1800 grooves/millimeter has a change in angle of $\Delta\alpha \approx 0.660$ milliradians for adjacent modes on each pass. This corresponds to a phase mismatch of $\Delta k=2.31$ radians, a value for which the parametric gain for these modes is reduced by 90%. The optical parametric oscillator 2 of the present invention overcomes the limitations of oscillators based on solid state materials by allowing much larger gain regions to be used, since spatial restriction is not required to achieve single longitudinal mode operation.

Figure 2:
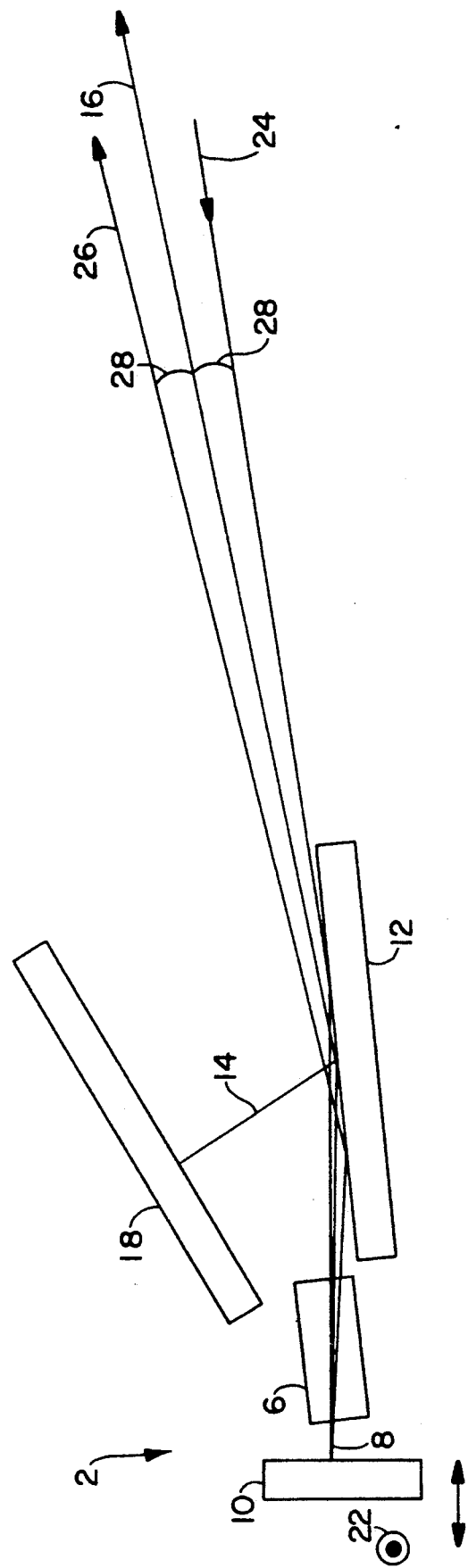
FIG. 2 is a schematic drawing of a second embodiment of a parametric source constructed in accordance with the invention.

Other embodiments of the present invention are also possible. These embodiments can be directed towards further improving the ability of the optical parametric oscillator to run consistently on a single longitudinal mode by using noncollinear phase matching. FIG. 2 shows a schematic diagram for an alternate embodiment of the invention. This alternate embodiment has the same components as described for the embodiment of FIG. 1. The major difference between the embodiments of FIGS. 1 and 2 is that in the alternate embodiment the pump beam energy enters the nonlinear medium 6 along an entrance pump path 24, is reflected by the first means for reflecting 10 and returns through the nonlinear medium 6 along an exit pump path 26.

Figure 3:
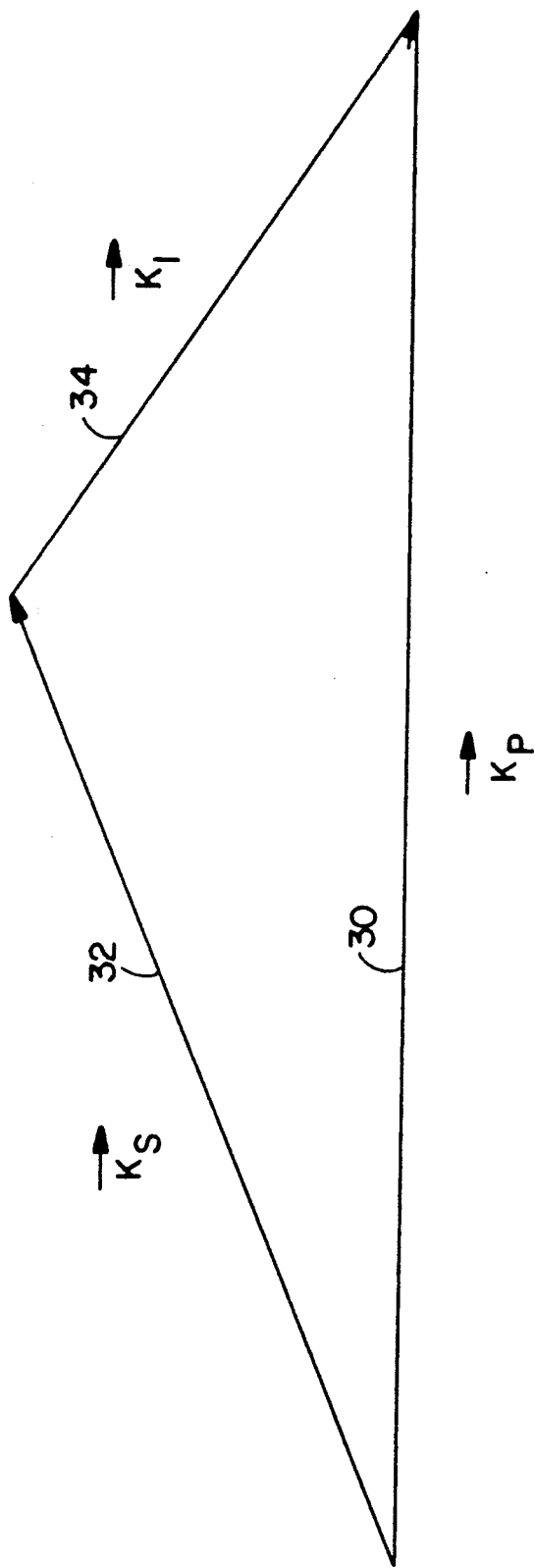
FIG. 3 is a graphical representation of the phase matching condition for optical parametric processes.

The entrance pump path 24 and the exit pump path 26 form an identical angle 28 with respect to the output energy optical path that comprises the reflective optical path 8 and the output path 16. The nonlinear medium 6, when adjusted to momentum match the frequencies of the noncollinear conversion process, produces optical signal energy along the reflective optical path 8 in response to pump energy along both the entrance and exit pump paths, 24 and 26. Optical idler energy (not shown) is also produced in both directions at angles determined by the momentum match condition that is graphically shown in FIG. 3. Vectors 30, 32 and 34 represent the k vectors $k_p$, $k_s$ and $k_j$, respectively. The length of the k vectors in FIG. 3 indicates the vector magnitude, $|k|$, while the orientation indicates the relative directions and angular relation of each wave.

Figure 4:
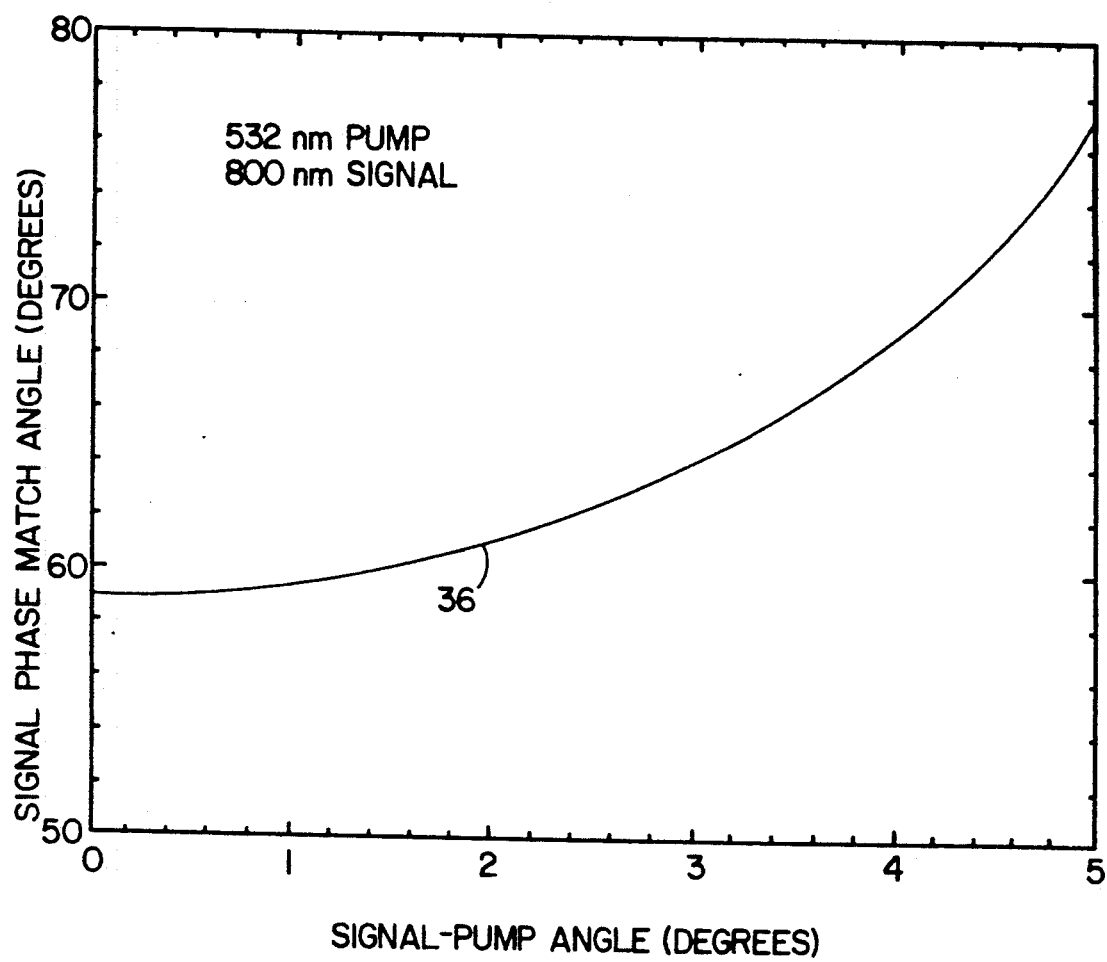
FIG. 4 is a graphical representation of the phase matching angle in KTP for type II parametric conversion in the x-z plane of 532 nanometers to 800 nanometers as a function of the angle between the signal and idler propagation directions.

The improvement in single longitudinal mode performance of the present invention when noncollinear pumping is used can be understood from the phase matching restrictions and the pumping configuration of the oscillator 2. FIG. 4 is a graphical representation of the phase matching conditions determined for noncollinear type II parametric conversion in KTP for the case where all waves propagate in the x-z crystal plane. A line 36 is the noncollinear phase matching curve that represents the single phase matching angle as a function of the non collinear angle between the signal and pump beams.

For the phase matching conditions shown, the polarization of the signal wave lies in the x-z plane and the pump and idler waves are polarized along the y-axis. In this configuration, the refractive index of the signal wave is dependant on the angle between the propagation direction and the z-axis, while the refractive indices of the pump and idler waves are independent of this angle. Phase matching (i.e. $\Delta k=0$) is achieved by rotating the nonlinear medium 6 with respect to the signal wave propagation, thus changing the refractive index experienced by the signal wave and hence the magnitude of the k vector of the signal wave. Line 36 in FIG. 4 shows that this phase matching angle changes as the noncollinear angle between the signal and pump beam directions is varied.

Figure 5:
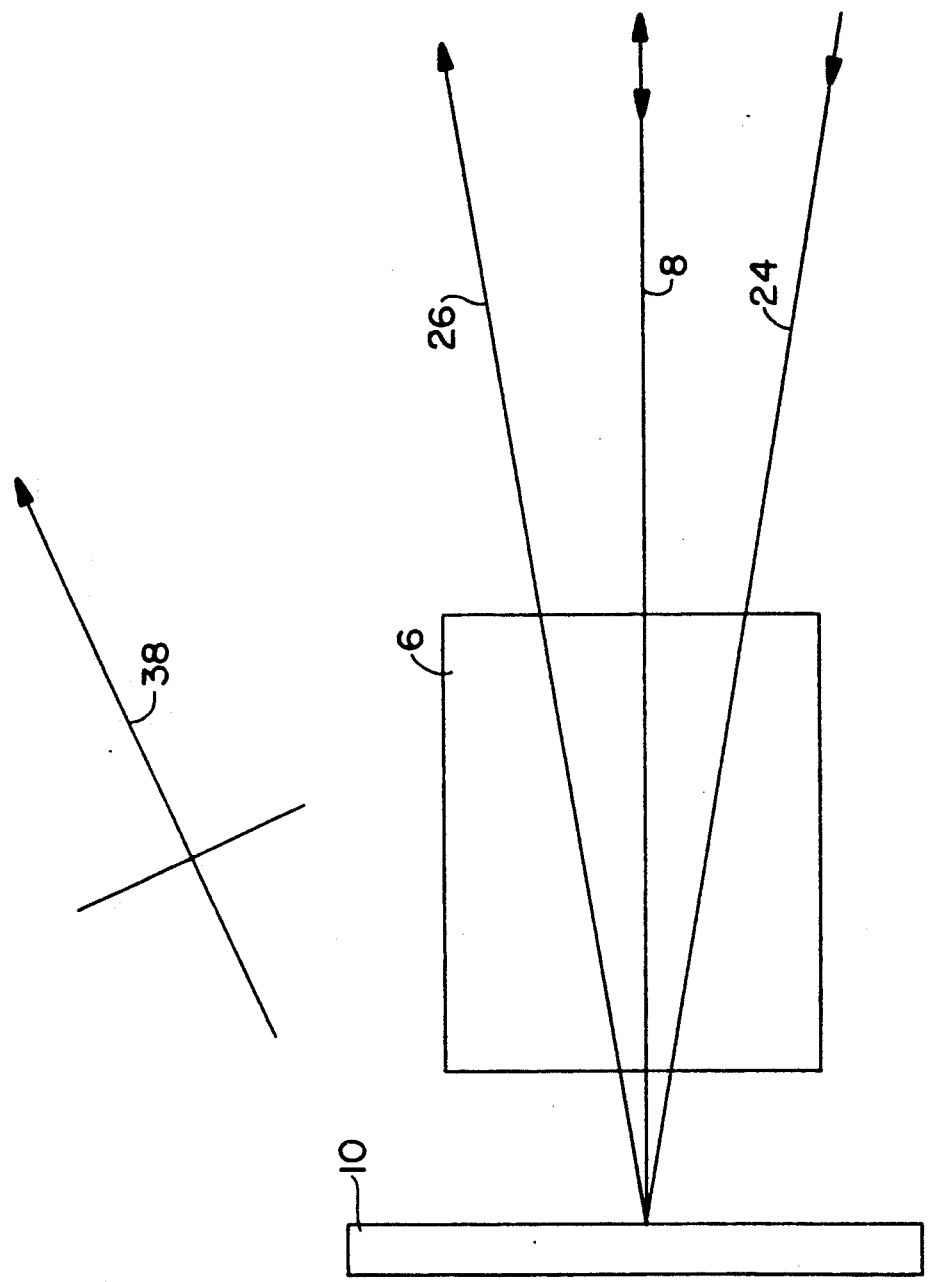
FIG. 5 is a schematic diagram of the angular relation between the three interacting waves for the case of noncollinear phase matching in the present invention.

FIG. 5 is a schematic diagram of the pump and signal beams through the nonlinear medium 6, showing the angular relation of the pump and signal waves to the z axis of the nonlinear medium 6 for the case of noncollinear pumping. The z axis is represented by a vector 38. The pump beam enters the nonlinear medium 6 along the entrance pump path 24. The pump beam is reflected by the first means for reflecting 10 back through the nonlinear medium 6 along the exit pump path 26. The signal beam passes through the nonlinear medium 6 along the reflective optical path 8. The entering pump beam along the entrance pump path 24 has a larger angle with respect to the z-axis of the nonlinear medium 6 than the signal beam along the reflective optical path 8, while the exiting pump beam along the exit pump path 26 has a smaller angle than the signal beam along the reflective optical path 8. In both directions, the signal wave has the same angular relation with the z-axis, so the parametric gain experienced by the signal wave will be identical for both the entrance and exit paths.

Figure 6:
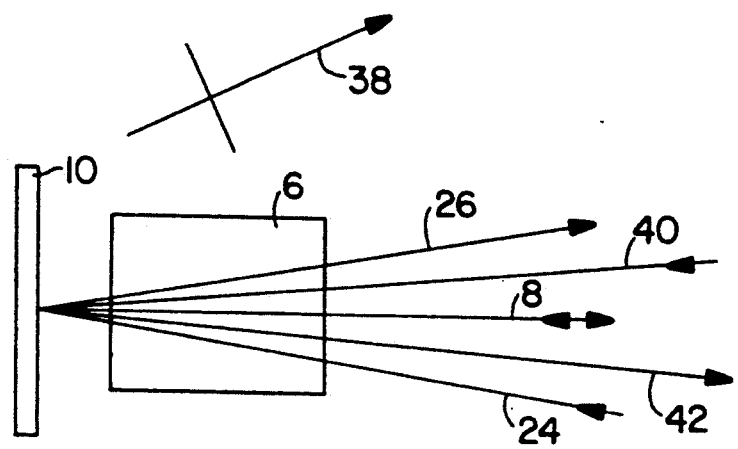
FIG. 6 is a schematic diagram of the angular relation between the three interacting waves and the red-shifted adjacent longitudinal mode for the case of noncollinear phase matching in the present invention.
Figure 7:
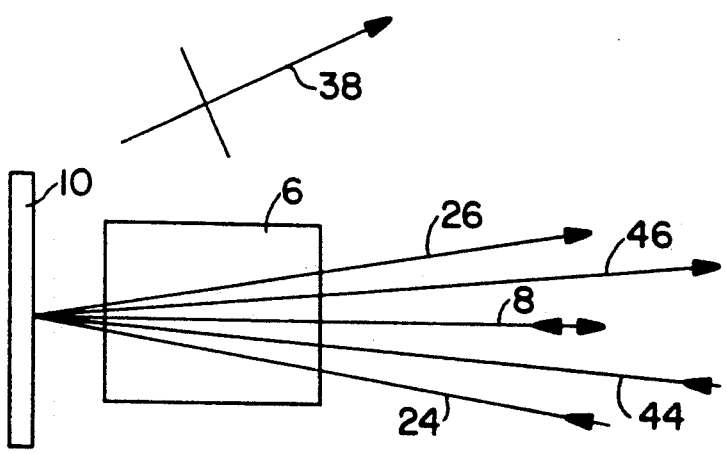
FIG. 7 is a schematic diagram of the angular relation between the three interacting waves and the blue-shifted adjacent longitudinal mode for the case of noncollinear phase matching in the present invention.

FIGS. 6 and 7 are schematic diagrams of the pump and signal beams through the nonlinear medium 6, showing the angular relation of the pump and signal waves to the z axis of the nonlinear medium 6 for the case of noncollinear pumping, as well as adjacent longitudinal modes in the oscillator 2 entering the crystal at an angle $\Delta\alpha$ with respect to the reflective optical path 8. This is shown in FIG. 6 for the case of an adjacent mode shifted to a frequency longer (red-shifted) than the signal frequency resonant in the cavity. This mode enters along an entrance path 40 having a smaller angle with respect to the z-axis of the nonlinear element 6 than the signal wave, and it exits along an exit path 42 having a larger angle with respect to the z-axis of the nonlinear element 6 than the signal wave. In both directions, this adjacent mode has a larger angle than the signal wave with respect to the pump beam traveling in the same direction. FIG. 7 shows the case of an adjacent mode shifted to a shorter (blue-shifted) frequency. In FIG. 7, this mode enters along an entrance path 44 having a larger angle with respect to the z-axis of the crystal than the signal wave, and it exits along an exit path 46 having a smaller angle with respect to the z-axis of the nonlinear element 6 than the signal wave. In both directions, this adjacent mode has a smaller angle than the signal wave with respect to the pump beam traveling in the same direction.

Figure 8:
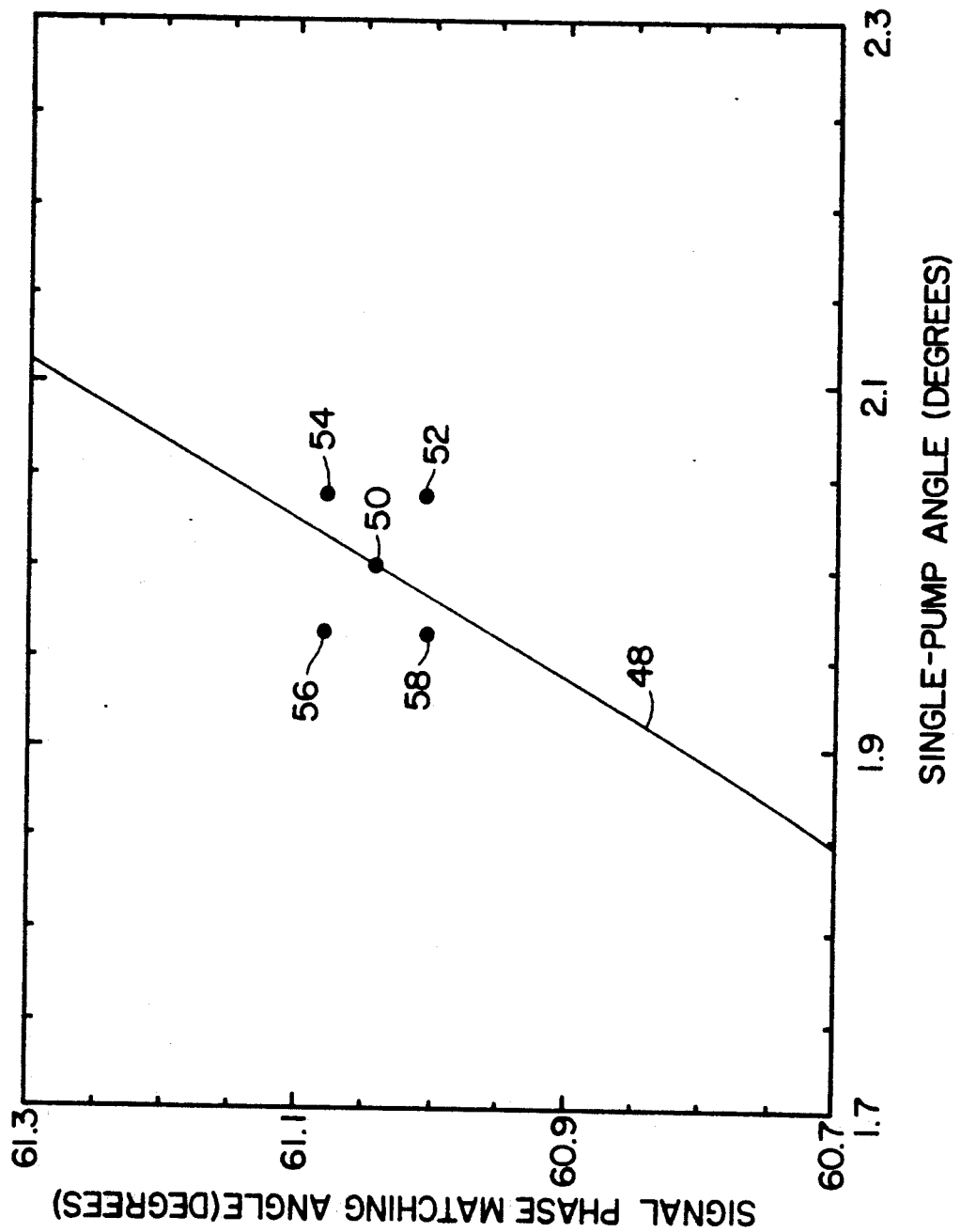
FIG. 8 is a graphical representation of the phase matching angle in KTP for type II parametric conversion in the x-z plane of 532 nanometers to 800 nanometers as a function of the angle between the signal and idler propagation directions that shows the shift in angles for adjacent longitudinal modes in the resonator of the present invention.

FIG. 8 is a graphical representation of the phase matching conditions determined for noncollinear type II parametric conversion in KTP for the case where all waves propagate in the x-z crystal plane and the noncollinear angle between the signal and pump for the resonated wave is 2.0 degrees. A line 48 is the noncollinear phase matching curve that represents the single phase matching angle as a function of the noncollinear angle between the signal and pump beam. A point 50 represents the point at which the noncollinear phase matching angle for the resonated wave between the signal and pump beams is 2.0 degrees. Points 52 and 54 represent the angles of the paths 40 and 42, respectively, for the red-shifted adjacent mode as shown in FIG. 6. Points 56 and 58 represent the angles of the paths 44 and 46, respectively, for the blue-shifted adjacent mode as shown in FIG. 7. In each direction, these adjacent modes are shifted farther away from the correct phase matching angle than would have been the case for collinear phase matching and will therefore experience significantly reduced gain. This represents a substantial improvement over collinear pumping geometries in discriminating against adjacent longitudinal modes of the oscillator 2. The noncollinear parametric oscillator 2 of the present invention thereby improves the single longitudinal mode performance by providing a noncollinear pumping configuration that significantly improves mode discrimination.

Thus there has been described herein a method and apparatus for broadly tuning optical parametric sources that produce single longitudinal mode energy over a wide variety of frequencies. It will be understood that various changes in the details, materials, steps and arrangements of parts that have been described and illustrated above in order to explain the nature of the invention may be made by those of ordinary skill in the art within the principle and scope of the present invention as expressed in the appended claims.

What is claimed is:

1. For a tunable optical parametric oscillator comprising an optical cavity having a predetermined optical length and a nonlinear medium, a method for producing single mode operation over a wide range of operating frequencies, comprising the steps of:

reflecting optical energy along a reflective optical path having a reflective path length that is received along said reflective optical path;

diffracting a signal frequency portion of said reflected optical energy onto a different path having a diffraction path length and an idler frequency portion of said reflected optical energy onto an output path, with said predetermined length of said optical cavity substantially equal to the sum of said reflective optical path length and said diffraction path length and said optical cavity length being sufficiently short to sustain optical energy having substantially only a single longitudinal mode along said reflective optical path;

reflecting said signal frequency optical energy received along said diffraction path back along said diffraction path;

orienting said diffraction path with respect to said reflective optical path to prevent said signal frequency optical energy from re-entering said reflective optical path; and positioning said nonlinear medium along said reflective optical path to produce a pulse of optical energy in a substantially single longitudinal mode along said reflective optical path in response to a pump beam of energy that is propagated substantially collinear with said output path.

2. In a tunable optical parametric oscillator comprising an optical cavity having a predetermined optical length and a nonlinear medium, apparatus for producing single mode operation over a wide range of operating frequencies, comprising:

first means for reflecting said signal frequency optical energy received along said diffraction path back along said diffraction path;

means for diffracting a signal frequency portion of said reflected optical energy onto a diffraction path having a diffraction path length and an idler frequency portion of said reflected optical energy onto an output path, with said predetermined length of said optical cavity substantially equal to the sum of said reflective optical path length and said diffraction path length and said optical cavity length being sufficiently short to sustain optical energy having substantially only a single longitudinal mode along said reflective optical path;

second means for reflecting said signal frequency optical energy received along said diffraction path back along said diffraction path;

means for orienting said diffraction path with respect to said reflective optical path to prevent said signal frequency optical energy from re-entering said reflective optical path; and means for positioning said nonlinear medium along said reflective optical path to produce a pulse of optical energy in a substantially single longitudinal mode along said reflective optical path in response to a pump beam of energy that is propagated substantially colliner with said output path.

3. For a tunable optical parametric oscillator comprising an optical cavity, a non liner medium, and a oscillator output path for energy produced by said oscillator, a method for producing single mode operation over a wide range of operating frequencies, comprising the steps of:

pumping said oscillator with pump energy having a pump frequency along a pump beam that is noncollinear with said oscillator output path to cause nonlinear medium to produce idler energy having an idler frequency and signal energy along said oscillator output path having a signal frequency; and adjusting said nonlinear medium to phase match said signal energy and said idler energy with said pump beam energy.

4. In a tunable optical parametric oscillator comprising an optical cavity, a non liner medium, and a oscillator output path for energy produced by said oscillator, apparatus for producing single mode operation over a wide range of operating frequencies, comprising:

means for pumping said oscillator with pump energy having a pump frequency along a pump beam path that is noncollinear with said oscillator output path to cause said nonlinear medium to produce idler energy having an idler frequency and signal energy along said oscillator output path having a signal frequency; and means for adjusting said nonlinear medium to phase match said signal energy and said idler energy with said pump beam energy.

* * * * *